US007366730B2

(12) United States Patent
Greenfield et al.

(10) Patent No.: US 7,366,730 B2
(45) Date of Patent: *Apr. 29, 2008

(54) REGISTRATION OF SOLVED CUBES WITHIN A RELATIONAL DATABASE MANAGEMENT SYSTEM

(75) Inventors: David Greenfield, Waltham, MA (US); Greg Dorman, New York, NY (US)

(73) Assignee: Oracle International Corporation, Redwood Shores, CA (US)

( * ) Notice: Subject to any disclaimer, the term of this patent is extended or adjusted under 35 U.S.C. 154(b) by 591 days.

This patent is subject to a terminal disclaimer.

(21) Appl. No.: 10/445,113

(22) Filed: May 23, 2003

(65) Prior Publication Data

US 2003/0208506 A1    Nov. 6, 2003

Related U.S. Application Data

(63) Continuation-in-part of application No. 10/424,003, filed on Apr. 25, 2003, now Pat. No. 7,171,427, which is a continuation-in-part of application No. 10/423,356, filed on Apr. 25, 2003.

(60) Provisional application No. 60/469,032, filed on May 7, 2003, provisional application No. 60/379,870, filed on May 10, 2002, provisional application No. 60/375,726, filed on Apr. 26, 2002.

(51) Int. Cl.
*G06F 17/30* (2006.01)
*G06F 17/40* (2006.01)

(52) U.S. Cl. .................... 707/102; 707/3; 707/101; 707/103 R; 707/104.1; 707/200

(58) Field of Classification Search ............. 707/1–10, 707/100–104.1, 200–205
See application file for complete search history.

(56) References Cited

U.S. PATENT DOCUMENTS 5,799,300 A    8/1998 Agrawal et al.

(Continued)

OTHER PUBLICATIONS

Ramsak, Frank, "Interactive ROLAP on Large Datasets: A Case Study with UB-Trees," Database Engineering & Applications, Jul. 16-18, 2001, pp. 167-176.

(Continued)

*Primary Examiner*—Shahid Al Alam
(74) *Attorney, Agent, or Firm*—Hickman Palermo Truong & Becker LLP (57) ABSTRACT

Performing operations on multidimensional data managed by a relational database system is facilitated by registration of solved cubes with a RDBMS. A solved cube is an abstract construct likened to a view or a table on relational data and contains not only base data, but also aggregated measure data that is base data that has been processed across multiple levels of a hierarchical dimension. In an embodiment, a solved cube may provide all the pre-computed aggregated data for a particular context that the solved cube represents. In another embodiment, a solved cube may not provide any pre-computed data, but may provide several procedures, operations and/or instructions that can be executed to compute aggregated data for a particular context that the solved cube represents. A solved cube is registered with a RDBMS by providing metadata that defines a given solved cube. Therefore, a database server is able interpret the metadata, and to perform operations on the given solved cube based on the metadata.

39 Claims, 4 Drawing Sheets

U.S. PATENT DOCUMENTS

| | | | |
|---|---|---|---|
| 5,832,516 A | 11/1998 | Bamford et al. | |
| 5,832,521 A | 11/1998 | Klots et al. | |
| 5,870,758 A | 2/1999 | Bamford et al. | |
| 5,918,232 A * | 6/1999 | Pouschine et al. | 707/103 R |
| 5,926,818 A * | 7/1999 | Malloy | 707/100 |
| 5,937,408 A * | 8/1999 | Shoup et al. | 707/102 |
| 5,943,677 A * | 8/1999 | Hicks | 707/205 |
| 5,987,467 A | 11/1999 | Ross et al. | |
| 6,119,103 A * | 9/2000 | Basch et al. | 705/35 |
| 6,163,774 A | 12/2000 | Lore et al. | |
| 6,205,447 B1 | 3/2001 | Malloy | |
| 6,285,994 B1 * | 9/2001 | Bui et al. | 707/2 |
| 6,385,301 B1 * | 5/2002 | Nolting et al. | 379/32.01 |
| 6,385,604 B1 | 5/2002 | Bakalash et al. | |
| 6,421,665 B1 | 7/2002 | Brye et al. | |
| 6,438,537 B1 | 8/2002 | Netz et al. | |
| 6,480,848 B1 | 11/2002 | DeKimpe et al. | |
| 6,484,179 B1 | 11/2002 | Roccaforte | |
| 6,493,699 B2 | 12/2002 | Colby et al. | |
| 6,553,366 B1 | 4/2003 | Miller et al. | |
| 6,560,594 B2 * | 5/2003 | Cochrane et al. | 707/2 |
| 6,601,062 B1 * | 7/2003 | Deshpande et al. | 707/3 |
| 6,609,132 B1 * | 8/2003 | White et al. | 707/103 R |
| 6,629,102 B1 | 9/2003 | Malloy et al. | |
| 6,665,682 B1 | 12/2003 | DeKimpe et al. | |
| 6,684,206 B2 * | 1/2004 | Chen et al. | 707/3 |
| 6,701,311 B2 | 3/2004 | Biebesheimer et al. | |
| 6,704,721 B1 * | 3/2004 | Hellerstein | 707/3 |
| 6,721,760 B1 * | 4/2004 | Ono et al. | 707/104.1 |
| 6,826,556 B1 | 11/2004 | Miller et al. | |
| 6,931,418 B1 | 8/2005 | Barnes | |
| 6,980,980 B1 | 12/2005 | Yeh | |
| 7,020,647 B1 | 3/2006 | Egan et al. | |
| 7,117,271 B2 * | 10/2006 | Haverstock et al. | 709/246 |
| 2002/0091707 A1 | 7/2002 | Keller | |
| 2002/0126545 A1 | 9/2002 | Warren et al. | |
| 2002/0138353 A1 | 9/2002 | Schreiber et al. | |
| 2002/0168621 A1 | 11/2002 | Cook et al. | |
| 2002/0188598 A1 | 12/2002 | Myllymaki | |
| 2003/0084053 A1 | 5/2003 | Govrin et al. | |
| 2003/0208506 A1 | 11/2003 | Greenfield et al. | |
| 2004/0236767 A1 * | 11/2004 | Soylemez et al. | 707/100 |

OTHER PUBLICATIONS

Ross, Kenneth A., "Serving Datacube Tuples from Main Memory," Scientific and Statistical Database Management, Jul. 26-28, 2000, pp. 182-195.

Oracle Corporation, "Oracle Express Server™ Database Administration Guide, Release 6.0," Part No. A47232-1, 1996, pp. 1-265 (text provided on CD-ROM).

Oracle Corporation, "Oracle Express, Analyzer Briefing Designer's Guide, Release 6.3," Sep. 1999, A70078-01, pp. 1-198 (text provided on CD-ROM).

Oracle Corporation, "Oracle Express, Database Administration Guide, Release 6.3.2.1," Jan. 2001, Part No. A82800-02, pp. 1-380 (text provided on CD-ROM).

Oracle Corporation, "Oracle OLAP," Data Sheet, 2000-2001, 5 pages.

Sandra Cheevers, Oracle Corporation, "Oracle9i Database Summary," An Oracle White Paper White Paper, May 2002, pp. 1-35.

Mark Townsend, Oracle Corporation, "Oracle9i New Features Summary," An Oracle White Paper, May 2001, pp. 1-27.

Oracle Corporation, "Oracle9i Database Release 2 New Features," An Oracle White Paper, May 2002, pp. 1-12.

* cited by examiner

TABLE 100

| ctry | sta | cit | $g_G$ | yr | qt | mo | $g_T$ | sales | frcst |
|------|-----|-----|-------|----|----|----|-------|-------|-------|
| USA | nul | nul | 3 | 01 | nul | nul | 3 | 15000 | 26000 |
| USA | nul | nul | 3 | 01 | Q3 | nul | 1 | 500 | 600 |
| USA | nul | nul | 3 | 01 | Q3 | 10 | 0 | 500 | 600 |
| USA | nul | nul | 3 | 01 | Q3 | 11 | 0 | 600 | 700 |
| USA | NYS | nul | 1 | 01 | nul | nul | 3 | 1300 | 1400 |
| USA | NYS | nul | 1 | 01 | Q3 | nul | 1 | 300 | 400 |
| USA | NYS | nul | 1 | 01 | Q3 | 10 | 0 | 300 | 400 |
| USA | NYS | nul | 1 | 01 | Q3 | 11 | 0 | 300 | 500 |
| USA | NYS | ALB | 0 | 01 | nul | nul | 3 | 600 | 700 |
| USA | NYS | ALB | 0 | 01 | Q3 | nul | 1 | 200 | 200 |
| USA | NYS | ALB | 0 | 01 | Q3 | 10 | 0 | 100 | 100 |
| USA | NYS | ALB | 0 | 01 | Q3 | 10 | 0 | 100 | 100 |
| USA | NYS | ALB | 0 | 01 | Q3 | 10 | 0 | 100 | 100 |
| USA | NYS | ALB | 0 | 01 | Q3 | 10 | 0 | 100 | 100 |
| USA | NYS | ALB | 0 | 01 | Q3 | 11 | 0 | 200 | 100 |
| USA | NYS | NYC | 0 | 01 | nul | nul | 3 | 400 | 350 |
| USA | NYS | NYC | 0 | 01 | Q3 | nul | 1 | 300 | 350 |
| USA | NYS | NYC | 0 | 01 | Q3 | 10 | 0 | 200 | 150 |
| USA | NYS | NYC | 0 | 01 | Q3 | 11 | 0 | 100 | 200 |

FIG. 1A

TABLE 150

| geog | $g_G$ | time | $g_T$ | sales | frcst |
|------|-------|------|-------|-------|-------|
| USA | 3 | 01 | 3 | 15000 | 26000 |
| USA | 3 | 01Q3 | 1 | 500 | 600 |
| USA | 3 | 01Q310 | 0 | 500 | 600 |
| USA | 3 | 01Q311 | 0 | 600 | 700 |
| NYS | 1 | 01 | 3 | 1300 | 1400 |
| NYS | 1 | 01Q3 | 1 | 300 | 400 |
| NYS | 1 | 01Q310 | 0 | 300 | 400 |

REGISTRATION OF SOLVED CUBES WITHIN A RELATIONAL DATABASE MANAGEMENT SYSTEM

CROSS REFERENCE TO RELATED APPLICATIONS

This application is a continuation-in-part application of and claims the benefit of domestic priority under 35 U.S.C. §120 from U.S. patent application Ser. No. 10/424,003 entitled "Methods Of Navigating A Cube That Is Implemented As A Relational Object" filed on Apr. 25, 2003, now U.S. Pat. No. 7,171,427, which claims the benefit of priority from U.S. Provisional Application Ser. No. 60/375,726 entitled "Integrating Online Analytical Processing (OLAP) Functionality into a Relational Database Management System (RDBMS)", filed Apr. 26, 2002 and from U.S. Provisional Application Ser. No. 60/379,870 entitled "Online Analytical Processing (OLAP) Operations and Access Structures for Data Stored in a Relational Database", filed May 10, 2002; all of which are incorporated by reference in their entirety for all purposes as if fully set forth herein.

This application is a continuation-in-part application of and claims the benefit of domestic priority under 35 U.S.C. §120 from U.S. patent application Ser. No. 10/423,356 entitled "Using Relational Structures To Create And Support A Cube Within A Relational Database System" filed on Apr. 25, 2003, which claims the benefit of priority from U.S. Provisional Application Ser. No. 60/375,726 entitled "Integrating Online Analytical Processing (OLAP) Functionality into a Relational Database Management System (RDBMS)", filed Apr. 26, 2002 and from U.S. Provisional Application Ser. No. 60/379,870 entitled "Online Analytical Processing (OLAP) Operations and Access Structures for Data Stored in a Relational Database", filed May 10, 2002; all of which are incorporated by reference in their entirety for all purposes as if fully set forth herein.

This application claims the benefit of domestic priority under 35 U.S.C. §119(e) from U.S. Provisional Application Ser. No. 60/469,032 entitled "Techniques for Managing Multidimensional Data in a Relational Database Management System", filed May 7, 2003; which is incorporated by reference in its entirety for all purposes as if fully set forth herein.

FIELD OF THE INVENTION

The present invention relates generally to database systems and, more specifically, to techniques for registration of solved cubes within a relational database management system.

BACKGROUND OF THE INVENTION

Dimensional Data

In the context of database systems, a "dimension" is a list of values that provide categories for data. A dimension acts as an index for identifying values of a variable. For example, if sales data has a separate sales figure for each month, then the data has a MONTH dimension. That is, the data is organized by month. A dimension is similar to a key in a relational database. Data that is organized by two or more dimensions is referred to as "multidimensional data".

Any item of data within a multidimensional measure can be uniquely and completely selected by specifying one member from each of the measure's dimensions. For example, if a sales measure is dimensioned by MONTH, PRODUCT, and MARKET, specifying "January" for the MONTH dimension, "Stereos" for the PRODUCT dimension, and "Eastern Region" for the MARKET dimension uniquely specifies a single value of the measure. Thus, dimensions offer a concise and intuitive way of organizing and selecting data for retrieval, updating, and performing calculations.

Multidimensional data may be stored in relational database systems ("RDBMS") or in specialized, "multidimensional" database systems ("MDDBMS"). Multidimensional database systems provide structures and access techniques specifically designed for multidimensional data, and therefore provide relatively efficient storage and access to multidimensional data. However, when stored in specialized multidimensional database systems, only applications that are specially built to interact with those multidimensional database systems are able to access and manipulate the data.

On the other hand, when stored in relational database systems, all applications that support interaction with relational databases have access to the data. Such database applications communicate with the relational database system by submitting commands that conform to the database language supported by the relational database system, the most common of which is the ANSI Structured Query Language (SQL).

Integration of Multidimensional and Relational Database Management Systems

Integration of multidimensional data with relational data in a relational database is an evolutionary process. Similarly, integration of multidimensional database techniques with relational database techniques is an evolutionary process. One step in this process involves using relational structures to create and support multidimensional data and associated structures, as well as OLAP (On Line Analytical Processing) operations, in a relational system.

OLAP Cubes, Measures, Dimensions and Hierarchies are concepts in OLAP that may be implemented in MOLAP (Multidimensional OLAP) engines. Such engines typically contain a Data Definition Language for defining these concepts, a language or an API to navigate through multidimensional cubes during analysis, and access structures to improve performance for OLAP queries. SQL includes language facilities, called CUBE, ROLLUP and GROUPING SETS, which can be used to implement OLAP operations in an RDBMS. Such facilities are useful for performing operations and for grouping associated results across multiple levels of multiple dimensional hierarchies, and provide solutions based on SQL statements.

However, such evolutionary steps may have shortcomings. For example, an approach to integrating multidimensional cube constructs in a relational database environment may be limited in its ability to perform complex operations and analysis on such constructs. For example, aggregation methods other than those supported by standard SQL (e.g., SUM, AVG, MAX, MIN, etc.) are (1) complex and difficult to implement in SQL; (2) may not perform well; and (3) may not be compatible with standard RDBMS optimization techniques such as materialized views (MVs) because of their complexity. Thus, more complex operations, such as scaled sum ("SSUM") weighted sum ("WSUM"), hierarchical average ("HAVERAGE"), weighted average ("WAVERAGE"), hierarchical weighted average ("HWAVERAGE"), first ("FIRST"), last ("LAST"), and the like, are not readily supported.

A common OLAP scenario involves the introduction of procedures, such as procedures written in PL/SQL or C programming languages, and execution of such procedures against MDDBMS-managed data. For example, complex operations such as allocations, forecasts and simultaneous equations may benefit from such procedures. However, the majority of such complex operations are not able to be solved by SQL alone, and, furthermore, conventional approaches do not support running such OLAP procedures against relationally managed data and storing associated results back in an RDBMS.

Based on the foregoing, there is a clear need for an improved mechanism for performing complex operations on multidimensional data managed by a relational database management system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and system are described for registration of solved cubes within a relational database management system. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview-Registration of Solved Cubes

Techniques are provided for performing operations on multidimensional data managed by a relational database system. Such techniques facilitate registration of solved cubes with a RDBMS. Conventional database systems do not support the concept of a solved cube, nor do they provide any mechanism for registering a solved cube in a RDBMS.

An unsolved cube is a table or set of tables that contains only leaf, or "unaggregated" data, together with associated metadata that describes this table or set of tables. With an unsolved cube, in order to access non-leaf, or "aggregated" data, it is the responsibility of the user of the system (e.g., and OLAP API) to issue the appropriate SQL query to "solve", or aggregate, data from the base tables. Aggregated data is base data that has been processed according to some function(s) or procedure(s) across multiple levels of a hierarchical dimension.

By contrast, a solved cube is a table or set of tables that contains all data, both leaf and aggregated, together with associated metadata that describes this table or set of tables. It is not the responsibility of the user of the system to solve or aggregate the data. In general, the user of the system is unaware of the method by which the data was solved. Rather, the person, system or application registering the solved cube is responsible for knowing how the data should be solved.

A solved cube is introduced in a RDBMS by communicating information about the solved cube to a database server so that it can perform operations on the solved cube. This process is referred to herein as "registering" a solved cube. The information used to define a solved cube may vary from implementation to implementation, as may the mechanism by which such information is communicated to and recorded by a database server.

According to an embodiment, a solved cube may comprise or identify all the pre-computed aggregated data for a particular scenario or context that the solved cube represents. For an example of a particular scenario, one may access monthly sales data and aggregate it at the quarter level, run a forecast for the following four quarters based on the quarter-aggregated data, and allocate (an operation that is opposite of aggregate) the forecasted quarterly data down to monthly forecasts, using multiple OLAP operational techniques. Metadata about the resulting data, which may be stored in a database table, can be registered with a RDBMS as a solved cube.

On the other hand, a solved cube may not comprise or identify any pre-computed data, but may identify or define a view that calls one or more procedures, operations and/or instructions that can be executed to compute the same resulting data as in the preceding example. Metadata about such a view can also be registered with a RDBMS as a solved cube. Hence, according to the framework described herein, the nature of the underlying implementation of a solved cube that is registered with a database server may vary from cube to cube, and such nature is transparent to a user performing operations on the solved cube.

According to one embodiment, a solved cube is registered with a RDBMS by registering metadata that defines the solved cube. The metadata includes (1) data that identifies that the cube is a solved cube; and (2) data that indicates how to handle requests that involve the solved cube. In response to a request for an operation on the solved cube, (1) operations to perform to fulfill the request are determined based on the metadata; and (2) such operations are performed.

According to an embodiment, a solved cube may have one of various "forms". According to one embodiment, a solved cube may have any one of the following forms: (1) a solved cube may contain processed data that is the result of, and is presented based on, a ROLLUP operation; (2) a solved cube may contain data that is the result of, and is presented based on, a GROUPING SET operation; and (3) a solved cube may contain data that has been processed and presented in an "Embedded Total" format.

Relational Cubes

Approaches for implementing MOLAP capabilities in a relational database system are described in U.S. patent application Ser. No. 10/424,003 entitled "Methods Of Navigating A Cube That Is Implemented As A Relational Object" and U.S. patent application Ser. No. 10/423,356 entitled "Using Relational Structures To Create And Support A Cube Within A Relational Database System." One such approach for implementing OLAP in a relational database system uses a concept called an RCUBE (Relational Cube). The RCUBE approach does not use any local multi-dimensional storage structures. Instead, the data resides in the relational tables of a relational database management system, and the queries are executed directly against those relational tables. In addition, the data stored in the relational tables may be accessed using pure ANSI SQL, without the use of a non-SQL API.

Relational cubes are generally referred to herein as "unsolved cubes". An unsolved cube is able to be solved solely using SQL statements. Moreover, a user of the system, such as an OLAP API, understands from the associated metadata how an unsolved cube is to be solved. That is, an unsolved cube is dynamically aggregated at runtime. For example, operations on data characterized as an unsolved cube, such as a SUM measure query, are solvable by a relational database server using conventional commands, as in the example query that follows.

SELECT year, quarter, month, SUM(sales), GROUPING_ID(year, quarter, month) GID
FROM fact, time
WHERE fact.tkey=time.tkey
GROUP BY rollup(year, quarter, month).

The rollup operator aggregates data across levels specified as the keys (or columns) of the rollup operator, specified in the GROUP BY line. For example, "GROUP BY rollup (year, quarter, month)" produces aggregated results grouped according to the following groups:
(year, quarter, month);
(year, quarter);
(year); and
( ).

These four groupings returned by this query are identified by the grouping id (GID) column values of 0, 1, 3 and 7, respectively.

A Concatenated (or "Rollup") Cube stores its parental lineage for each level in a hierarchy. For example, for the quarter level, the Concatenated Cube also stores the parent of the quarter level, namely year.

For another example, operations on data characterized as an unsolved cube are solvable by a relational database server using a conventional GROUPING SET extension to a GROUP BY clause, as in the example query that follows.
SELECT year, quarter, month, SUM(sales), GROUPING_ID(year, quarter, month) GID
FROM fact, time
WHERE fact.tkey=time.tkey
GROUP BY GROUPING SETS ((month), (quarter), (year), ( )).

The four groupings returned by this query are identified by the grouping id (GID) column values of 6, 5, 3 and 7, respectively.

Evaluation of this query generates results with data aggregated over the three groupings specified by the grouping sets operator. In general, execution of the grouping sets operator aggregates data across levels specified as the arguments (or columns) of the grouping sets specification in the GROUP BY line. Thus, the exact grouping sets specified are generated. In contrast to the Concatenated Cube, the Grouping Set Cube does not store parental lineage.

In an embodiment, support for solving unsolved cubes associated with complex operations is provided. Metadata is associated with an unsolved cube upon construction of the cube, such that operations such as FIRST, LAST, HAVERAGE, WAVERAGE, and other complex operations can be performed against the cube. The metadata is interpreted by a program and used to manipulate underlying relationally managed multidimensional data to service requests for such complex operations.

Solved Cubes

In contrast to relational cubes, which are solvable with conventional SQL statements, solved cubes are database objects that contain sufficient information to indicate how to handle requests that involve a given solved cube without further intervention from the user of the system. An instance of a given solved cube can exist in a given state, where the acceptable states range from a state in which (1) all the pre-computed aggregated measure data for a particular scenario or context that the solved cube represents is provided; to a state in which (2) one or more procedures, operations and/or instructions are provided and/or referenced, such as in a view, which can be dynamically executed to compute the resulting measure data for a particular scenario or context that the solved cube represents. A solved cube contains sufficient information to obtain measure data that is processed at all combinations of all levels of all dimensions associated with a given solved cube.

For an example of a solved cube that presents pre-computed measure data (such as with (1) in the paragraph above), such solved cube may contain measure data that is pre-processed by accessing monthly sales data ("base data"), aggregating the monthly data at the quarter level, running a forecast for the following four quarters based on the quarter-aggregated data, and allocating or distributing the quarter-forecast data down to following month-forecast data. Resulting data may be stored in a table, which is accessed by a database server when performing an operation on the solved cube. In such a case, metadata about the result table is registered with a-database system as a solved cube.

For an example of a solved cube that calls procedures, operations and/or instructions for computing measure data (such as with (2) in the paragraph above), such cube metadata may include metadata about the view. Such a view may include, for example, (1) references to base data stored in relational tables, (2) references to aggregated data stored in relational tables or in an analytic workspace, (3) calls or references to executable procedures and/or logic for obtaining or computing measure data for all levels of all dimensions associated with the given solved cube, and (4) instructions (e.g., a "roadmap") as to how to handle any type of data request or operation associated with the given solved cube. All such cube metadata is in the context of a particular scenario, such as that described in the preceding paragraph. With respect to "handling" any type of request, this means that enough information is provided to produce the results of an operation against a solved cube. Hence, in contrast with materialized views, cube metadata for solved cubes can contain and/or reference procedures rather than just SQL statements.

As mentioned, according to the framework described herein, the nature of solved cubes that are registered with a database server may vary from cube to cube. Furthermore, due to the techniques described herein, the underlying nature of cube metadata for a solved cube is transparent to a user performing operations on or querying the solved cube and to a database server SQL generator. For example, a user can issue an OLAP query against a given solved or unsolved cube stored in an analytic workspace. In response to the query, a database server generates one or more SQL statements to run against the cube, without the user being aware of the nature of the cube metadata. The abstract construct of solved cubes, and the ability to process requests against a solved cube by a database server, provides for a vast spectrum of complex operations on complex multidimensional data, including extended OLAP schemas.

SOLVED CUBE EXAMPLES

Several non-limiting examples of solved cubes are provided as follows, to illustrate various "configurations" that a solved cube may take.

(1) A procedure is executed in a separate application that creates a table in a database, and metadata associated with the table is registered as a solved cube. The application itself may store metadata about the procedure, for example, when the procedure was last executed. However, this metadata may or may not be stored in the database.

(2) A PL/SQL procedure is executed that creates a table in a database, and metadata associated with the table is registered as a solved cube. In this case, the "solve" is defined by the PL/SQL program. The program may also be stored in the database. Regardless, enough information is registered with the database system, in the form of the view metadata, such that any operation on the cube can be handled.

(3) A view is defined in pure SQL, and metadata associated with the view is registered as a solved cube. In this case, the view definition metadata contains all of the information required to "solve" the data.

(4) A view is defined that calls out a procedure, such as a PL/SQL procedure, and metadata associated with the view is registered as a solved cube. In this case, the view definition metadata does not contain all of the information required to "solve" the data, since the procedure is involved. However, enough information is registered with the database system, in the form of the view metadata, such that any operation on the cube can be handled.

(5) A view is defined that calls out a procedure, such as a PL/SQL procedure, which itself makes a call to a separate application, such as an application written in the Java programming language. Metadata associated with the view is registered as a solved cube. In this case, the view definition metadata does not contain all of the information required to "solve" the data, since the procedures are involved. However, enough information is registered with the database system, in the form of the view metadata, such that any operation on the cube can be handled.

(6) A view is defined that uses a generic table function. A table function is a function that returns a result set and which can be called in the FROM clause of a query, as if the function's result set were a table. For example, the table function may be implemented in PL/SQL. Metadata associated with the view is registered as a solved cube. In this case, the view definition metadata does not contain all of the information required to "solve" the data, since the table function/procedure is involved. However, enough information is registered with the database system, in the form of the view metadata, such that any operation on the cube can be handled.

(7) A view is defined that uses a table function to call into an analytic workspace (see "Analytic Workspace" below). The analytic workspace contains a "variable" (e.g., a cube) that has been pre-solved by running a set of OLAP DML procedures. Metadata associated with the view is registered as a solved cube. In this case, the view definition metadata does not contain all of the information required to "solve" the data, since the OLAP DML procedures are involved. In this case, the "solve" is defined by the OLAP DML procedures. The procedures may also be stored in the database. Regardless, enough information is registered with the database system, in the form of the view metadata, such that any operation on the cube can be handled.

(8) A view is defined that uses a table function to call into an analytic workspace. The analytic workspace contains a "variable" (e.g., a cube) that is solved by means of an "AggMap" in the analytic workspace. An AggMap is a metadata object that describes completely how the cube should be solved. Metadata associated with the view is registered as a solved cube. Furthermore, "solve metadata" associated with the AggMap is also registered with and stored in the database system, albeit not necessarily in a traditional location. Regardless, enough information is registered with the database system, in the form of metadata, such that any operation on the cube can be handled.

Hence, the details of how a given cube was or is to be solved are not always contained in the metadata that is registered with the database system. However, as described, enough information is registered with the database system, in the form of metadata, such that any operation on the cube can be handled, albeit at times with the aid of procedural calls. Therefore, a wide range of solved cubes can be supported, as illustrated by the foregoing non-limiting examples.

Analytic Workspaces

The data and metadata for solved cubes is commonly stored in analytic workspaces; however, it may be stored in relational tables or elsewhere.

An analytic workspace is a storage type that provides multidimensional structures that are compatible with multidimensional database objects such as dimensions, variables, formulas, relations, and valuesets. Analytic workspaces can persist across sessions and be shared by multiple user sessions. In the context of OLAP operations, an analytic workspace includes a set of data that is being manipulated according to the OLAP operations. The data underlying an analytic workspace may be stored persistently in relational database tables, as BLOBs (binary large object), for example. Furthermore, the data associated with an analytic workspace may comprise a portion of a multidimensional cube.

SQL Views

OLAP schemas and relational schemas are inherently different. With reference to the concept of relational cubes described above, aggregated measures on dimensional data that is relationally managed (e.g., by an RDBMS) are typically stored as result sets in tables that contain a column for each level of each dimensional hierarchy. By contrast, aggregated measures on multidimensional data that is multi-dimensionally managed (e.g., by a MDDBMS) are typically stored as multi-dimensionally indexed arrays without storing dimensional hierarchies in terms of associated levels. Thus, in order to support complex OLAP operations in a RDBMS, a bridge between the two inherently different data structures, schemas and operations is beneficial.

The techniques described herein provide support of extended OLAP schemas in RDBMS storage. One supporting method involves the use of SQL views which map a native relational schema model to a schema model that an OLAP API can understand. An OLAP API to a relational database can recognize the views and, hence, the type and form of data returned. Thus, an OLAP API can generate an appropriate SQL statement for querying OLAP objects. For example, using solved cubes, an OLAP API can perform operations on a rollup cube, as provided, without generating and executing a GROUP BY/ROLLUP clause.

Solved Cube Forms

Solved cubes can be built using various forms, which have inherent properties understood by an OLAP API according to the techniques described herein. Embodiments include the following forms of solved cubes: (1) a rollup cube; (2) a grouping set cube; and (3) an embedded total cube. Recognition of a given form of solved cube provides "intelligence" to an OLAP API, which is passed to an associated SQL generator to assist in query generation relative to the given solved cube. That is, knowledge that a solved cube is of a particular form allows for inference of a certain structure to the relevant data associated with the solved cube. According to an embodiment, metadata is established that defines the form of a solved cube. A suitably configured program, such as a database server or an OLAP API to a database server, can interpret the metadata and can process data accordingly. The metadata includes (1) data that identifies that the provided cube is a solved cube, and (2) data that indicates how to handle requests that involve the solved cube. For example, metadata is provided that identifies the particular form of the solved cube, if applicable.

Rollup/Grouping Set Form of Solved Cube

Rollup cubes and grouping set cubes organize and/or store measure data in a real or virtual table per hierarchy combination, where one hierarchy is taken from each dimension of the cube. Within each table there is a column for each level of each hierarchy and, in addition, there is a grouping identifier ("gid") column per hierarchy. Thus, knowledge that a solved cube is of a particular form allows for inference of a certain structure to the relevant pre-computed and pre-grouped, i.e., aggregated, data associated with the solved cube. Metadata that defines a solved cube, and its form if applicable, is provided to a program such as an OLAP API.

Figure 1A:
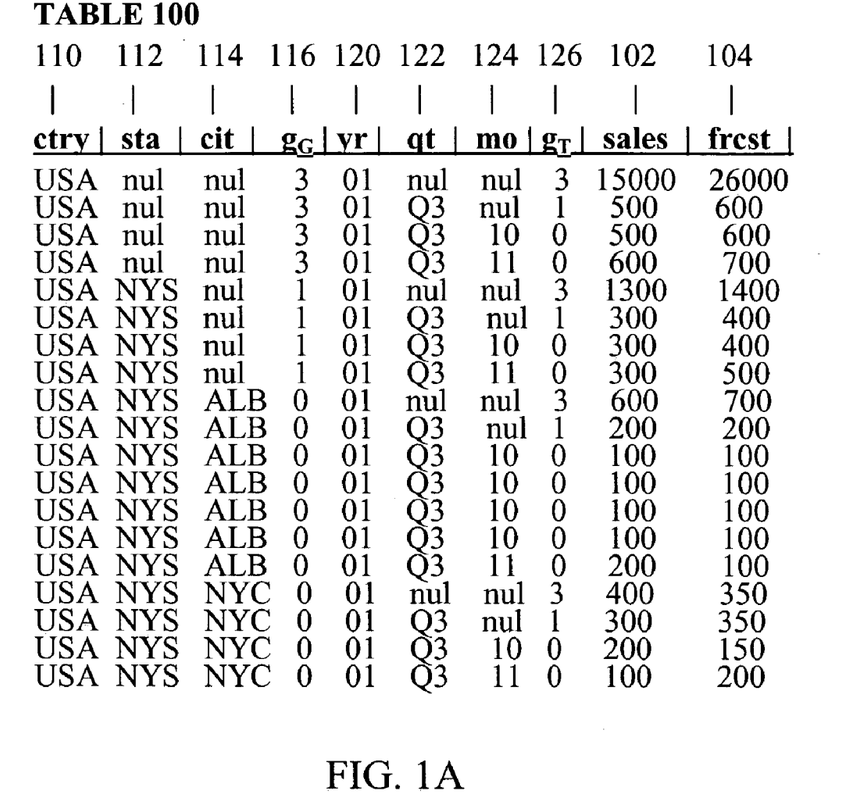
FIG. 1A illustrates an example table that represents a measure view result set that is associated with a solved cube having rollup form.

FIG. 1A illustrates an example table 100 that represents a measure view result set that is associated with a solved cube having rollup form. Table 100 is a measure view for two measures, indicated by sales column 102 and forecast ("frcst") column 104. Both measures are dimensioned by Geography and Time. The hierarchy associated with the Geography dimension includes levels for country ("ctry"), state ("sta"), and city ("cit"), indicated by country column 110, state column 112 and city column 114, respectively. The hierarchy associated with the Time dimension includes levels for year ("yr"), quarter ("qt"), and month ("mo"), indicated by year column 120, quarter column 122 and month column 124, respectively. Each of the columns stores values for the associated level.

In addition, table 100 includes grouping identifier ("gid") columns for each respective dimension, indicated by Geography gid column ("$g_G$") 116 and Time gid column ("$g_T$") 126, respectively. Grouping identifiers identify at what level of an associated dimensional hierarchy the measure value in a given row is grouped. In one embodiment, gids are based on a bit vector on the respective dimensional columns.

Interpreting metadata provided with a solved cube allows a program to understand the form of the solved cube and which columns contain which data. Therefore, queries can be generated on the solved cube.

Similarly, example table 100 illustrates the table structure of a measure view result set that is associated with a solved cube having grouping set form. However, due to the differences between how rollup operations and grouping set operations group result sets, and, therefore, how associated respective cubes are populated, a grouping set solved cube may contain different data than the data shown in table 100. For example, tables associated with grouping set solved cubes have comparable columns as corresponding rollup cubes, however, grouping set cubes commonly have less information than rollup cubes because they group results according to specified grouping sets and not by all grouping combinations, as with rollup.

As with rollup solved cubes, result sets associated with grouping set solved cubes are defined by metadata. Interpretation of the metadata by a program such as an OLAP API allows for inference of a table structure in which pre-computed and pre-grouped data is organized or stored.

Embedded Total Form of Solved Cube

Solved Embedded Total (ET) cubes organize and/or store measure data in a real or virtual table per hierarchy combination, where one hierarchy is taken from each dimension of the cube. Within each table there is a single column per hierarchy that contains both detail dimension values as well as aggregated dimension values across levels of a dimension hierarchy. In addition, there is a grouping identifier ("gid") column per hierarchy. The ET form may be used with either relationally stored source data or with source data stored in an analytic workspace construct. As with rollup and grouping set solved cubes, result sets associated with ET solved cubes are defined by metadata. Interpretation of the metadata by a program such as an OLAP API allows for inference of a table structure in which precomputed data is organized or stored.

Figure 1B:
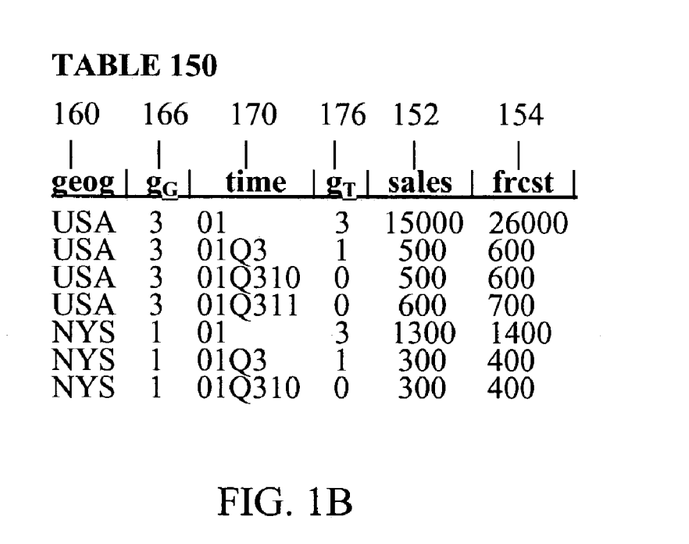
FIG. 1B illustrates an example table that represents a measure view result set that is associated with a solved cube having embedded total form.

FIG. 1B illustrates an example table 150 that represents a measure view result set that is associated with a solved cube having embedded total form. Translating a portion of Table 100 into ET form would result in Table 150. Note, however, that not all translated rows are shown in Table 150. Table 150 is a measure view for two measures, indicated by sales column 152 and forecast ("frcst") column 154. Both measures are dimensioned by Geography and Time. The hierarchy associated with the Geography dimension is represented by a single column, indicated by geography ("geog") column 160. All levels of the Geography dimension are represented by values in the geography column 160. The hierarchy associated with the Time dimension is represented by a single column, indicated by time column 170. All levels of the Time dimension are represented by values in the time column 170.

Table 150 also includes grouping identifier ("gid") columns for each respective dimension, indicated by Geography gid column ("$g_G$") 166 and Time gid column ("$g_T$") 176, respectively. As mentioned, grouping identifiers identify at what level of an associated dimensional hierarchy the measure value in a given row is grouped.

Translation techniques may be used to translate among forms of solved cubes. For example, a rollup or grouping set solved cube can be translated to an embedded total solved cube. However, an embedded total solved cube cannot be translated into a rollup solved cube since the embedded total cube contains less information than a rollup cube. Thus, the cube is in an efficient format that is more compatible with OLAP operations on an analytic workspace than with transactional operations on relational data. Furthermore, different solved cube forms can be joined together to fulfill a given query. For example, one measure (e.g., sales) is in rollup form and another measure (e.g., cost) is in ET form, and one wishes to run an analytical query on sales minus cost. In such a scenario, one form is translated into another form so that SQL can be generated and executed against the result sets to service the request. For example, the rollup form is translated into ET form, the two cube result sets are joined, and sales minus cost is computed and returned, all in response to the user query request.

Translation techniques may also be used to translate among solved and unsolved cubes. In the preceding example, the sales measure may be in unsolved cube form and the cost measure in ET form. Translation techniques solve the unsolved sales cube using one or more conventional SQL statements, whereby it is further processed into ET form and results computed therefrom.

Operating Environment

Figure 2:
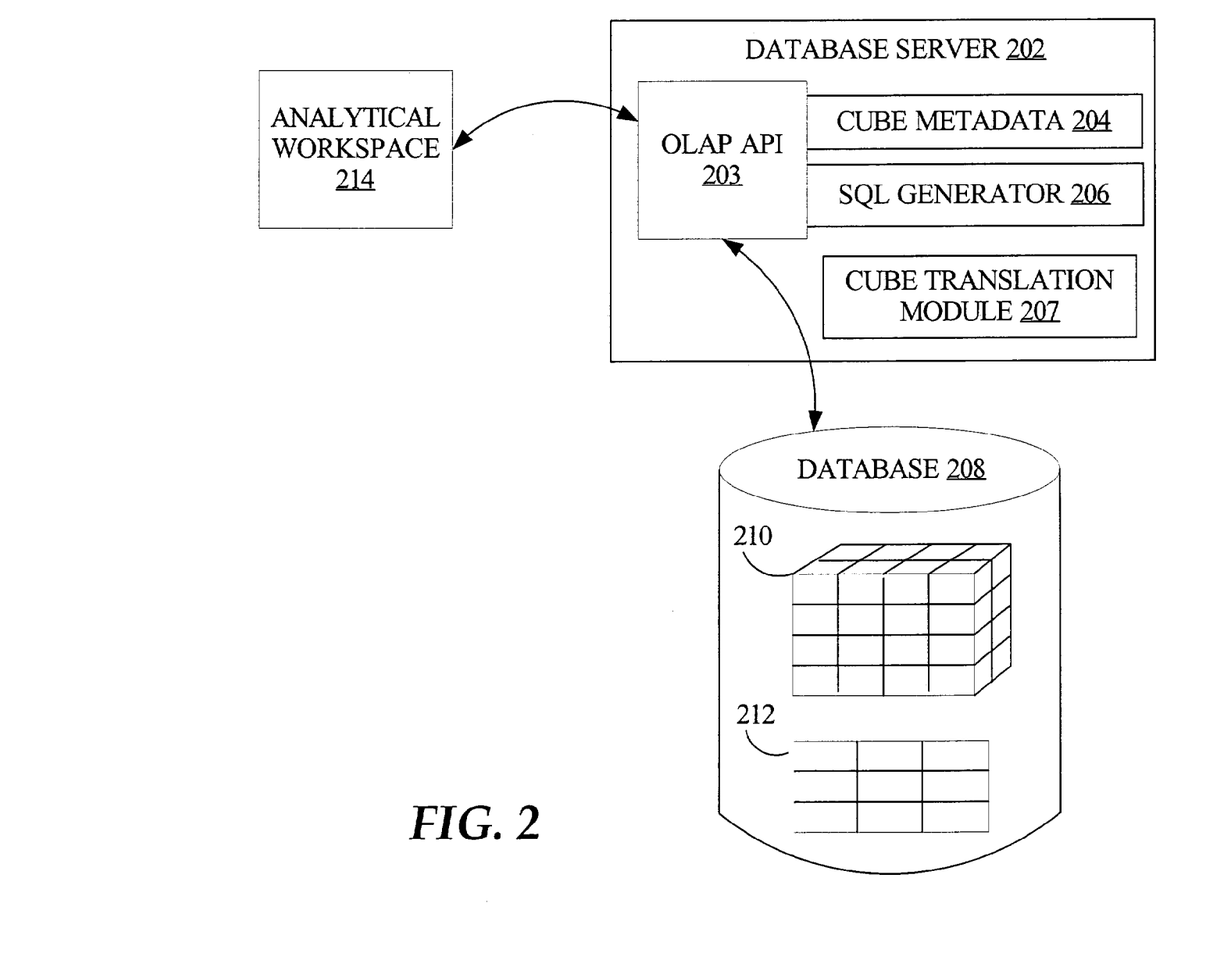
FIG. 2 is a block diagram that illustrates an operating environment in which embodiments of the invention may be implemented.

FIG. 2 is a block diagram that illustrates an operating environment in which embodiments of the invention may be implemented.

The operating environment includes a database server 202 and a database 208. Database server ("server") 202 comprises one or more computer programs or other software elements for implementing functions described herein. Database 208 is communicatively coupled to server 202 and is a repository for storing data, metadata and other information. In particular, database 208 is a repository for storing cube metadata 204 that defines solved cubes, as described above.

In one embodiment, database 208 stores one or more multidimensional cubes 210, an abstract data construct that represents multidimensional data. As mentioned, data that is organized by two or more dimensions is referred to as multidimensional data. Multidimensional cube 210 is different than solved and unsolved cubes, which are defined by metadata and are constructed on relational data or multidimensional data such as a multidimensional cube 210.

In one embodiment, database 208 stores relational database tables such as table 212. Table 212 may store relationally managed base data, as well as pre-computed aggregated data associated with a solved cube, such as table 100 of FIG. 1A and table 150 of FIG. 1B. For example, table 212 may be in rollup form, grouping set form, embedded total for, or other formats. Furthermore, in one embodiment, database 208 stores both multidimensional cubes 210 and relational tables 212. Hence, in such an embodiment, database 208 is part of a RDBMS that is capable of storing, managing and manipulating relational and multidimensional data and that provides structures and access techniques specifically designed for multidimensional data.

In one embodiment, database server 202 includes an OLAP API (application programming interface) 203, which is an interface to an application that is specially built to interact with the multidimensional data, such as cube 210. OLAP API 203 is able to interpret the multidimensional data which, in one embodiment, is stored as one or more BLOBs in a database table, such as table 212 of database 208. OLAP API 203 is able to interpret metadata that defines solved cubes, such as cube metadata 204, and to interface with a SQL generator 206 for generating SQL for solving unsolved cubes or for handling requests on solved cubes.

Database server 202 further includes a cube translation module 207. Cube translation module 207 comprises one or more computer programs or other software elements for implementing translation functions among cubes. For example, cube translation module 207 facilitates translation of unsolved cubes to particularly formatted solved cubes and translation of one form of solved cube to another form of solved cube, as described above.

Illustrated in FIG. 2 is an analytic workspace ("AW") 214. As mentioned, an analytic workspace is a construct that provides multidimensional structures that are compatible with multidimensional database objects such as dimensions, variables, formulas, relations, and valuesets. Therefore, analytic workspace 214 includes a set of data on which extended or complex OLAP operations can be performed. In an embodiment, analytic workspaces are acquired from database 208 via procedures associated with OLAP API 203 of server 202.

Performing an Operation on Multidimensional Data Managed by an RDBMS

Figure 3:
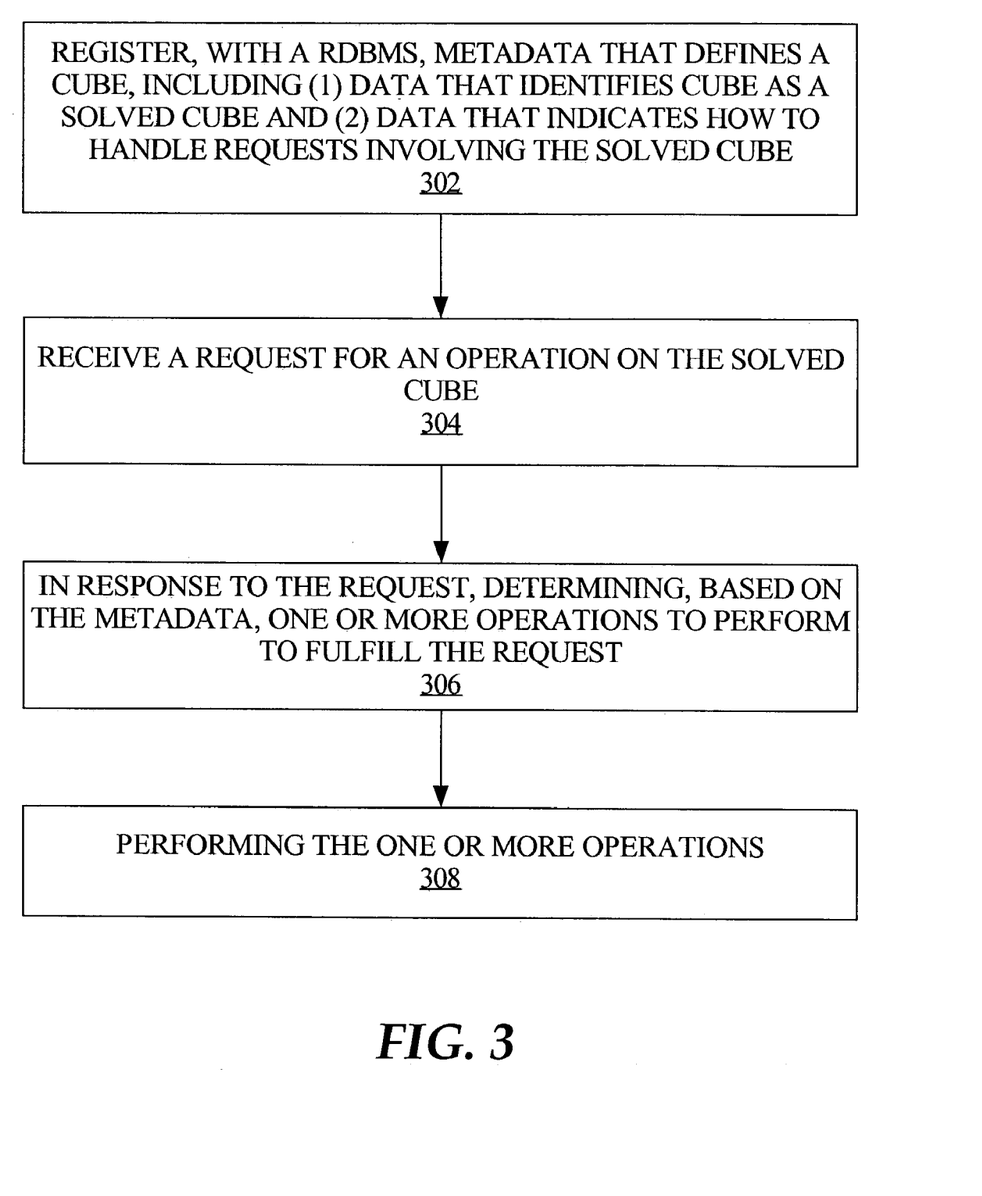
FIG. 3 is a flow diagram that illustrates a method for performing an operation based on multidimensional data that is managed by a relational database management system.

FIG. 3 is a flow diagram that illustrates a method for performing an operation based on multidimensional data that is managed by a relational database management system. The multidimensional data is stored in a relational database and includes a plurality of dimensions. At least one of the dimensions includes a hierarchy having two or more levels of granularity.

At block 302, metadata that defines a cube is registered with the relational database management system. The metadata that defines the cube includes (1) data that identifies that the registered cube is a solved cube; and (2) data that indicates how to handle requests that involve the solved cube. Registering a cube, or metadata that defines a cube, refers to a process of communicating such information to a database server so that the server can access and interpret the information to perform operations on the cube. As mentioned, the information used to define a solved cube may vary from implementation to implementation, as may the mechanism by which such information is communicated to and recorded by a database server.

In one embodiment, the metadata registered at block 302 includes data that identifies one or more mechanisms for obtaining all the data associated with the solved cube. The mechanisms may be, for example, references to a table that is storing pre-computed aggregated measure values (e.g., a summary or aggregation table), with metadata that describes the configuration of the table. The mechanisms may be, for another example, references to procedures that, when executed, compute aggregated measure values, along with instructions or directions for computing such measure values.

In one embodiment, the metadata registered at block 302 identifies where to locate, in the database, particular data from a set of data that is pre-computed across multiple levels of the dimension having the hierarchy of levels. For example, metadata identifies the form of the solved cube (e.g., rollup, grouping set, embedded total) and the specific configuration of the solved cube result set table, such as what columns store (1) values associated with a given level of a given dimension, (2) grouping identifiers that identify the level of a dimension at which a measure value associated with a particular table entry (e.g., rows) is grouped, and (3) measure values, which may be aggregated data for any given table entry. For example, metadata may identify the configuration of a table such as table 100 of FIG. 1A or table 150 of FIG. 1B.

At block 304, a request for an operation on the solved cube is received. For example, a database user performing OLAP operations on a set of multidimensional data, such as through OLAP API 203 to analyze data in analytic workspace 214 (FIG. 2), requests aggregated or otherwise processed and grouped measure data for various grouping combinations of geography/time dimensions.

At block 306, in response to the request, one or more operations which can be performed to fulfill the request received at block 304 are determined, based on the metadata registered at block 302. For example, database server 202 (FIG. 2) interprets metadata to determine that a table that is associated with a solved ET cube contains data that fulfills the request, to determine the location of particular data that fulfills the request and to determine operations to access such data, such as generating and executing a SQL query on the table. Such a SQL query may be generated by or in conjunction with SQL generator 206 (FIG. 2) of database server 202. For another example, database server 202 (FIG. 2) interprets metadata to determine that multiple relational tables (e.g., a fact table and multiple related dimension tables) contain data that fulfills the request, determines that procedures are available to process the data according to a particular scenario, and determines specific procedures to compute specific measure data that fulfills the request.

At block 308, the one or more operations determined at block 306 are performed. For example, a SQL statement is executed against a table, or for another example, base data is aggregated using a SQL statement and procedures are executed that manipulate the aggregated data.

In one embodiment, the metadata registered at block 302 identifies one or more procedures for obtaining data associated with the solved cube. Further, the step of performing one or more operations, block 308, includes executing a procedure of the one or more procedures to fulfill the request for an operation on the solved cube.

Hence, techniques are described herein for performing operations on multidimensional data managed by a RDBMS, through registration with the RDBMS of metadata that defines solved cubes, wherein operations are determined that, when performed, fulfill a request on a given solved cube.

Hardware Overview

Figure 4:
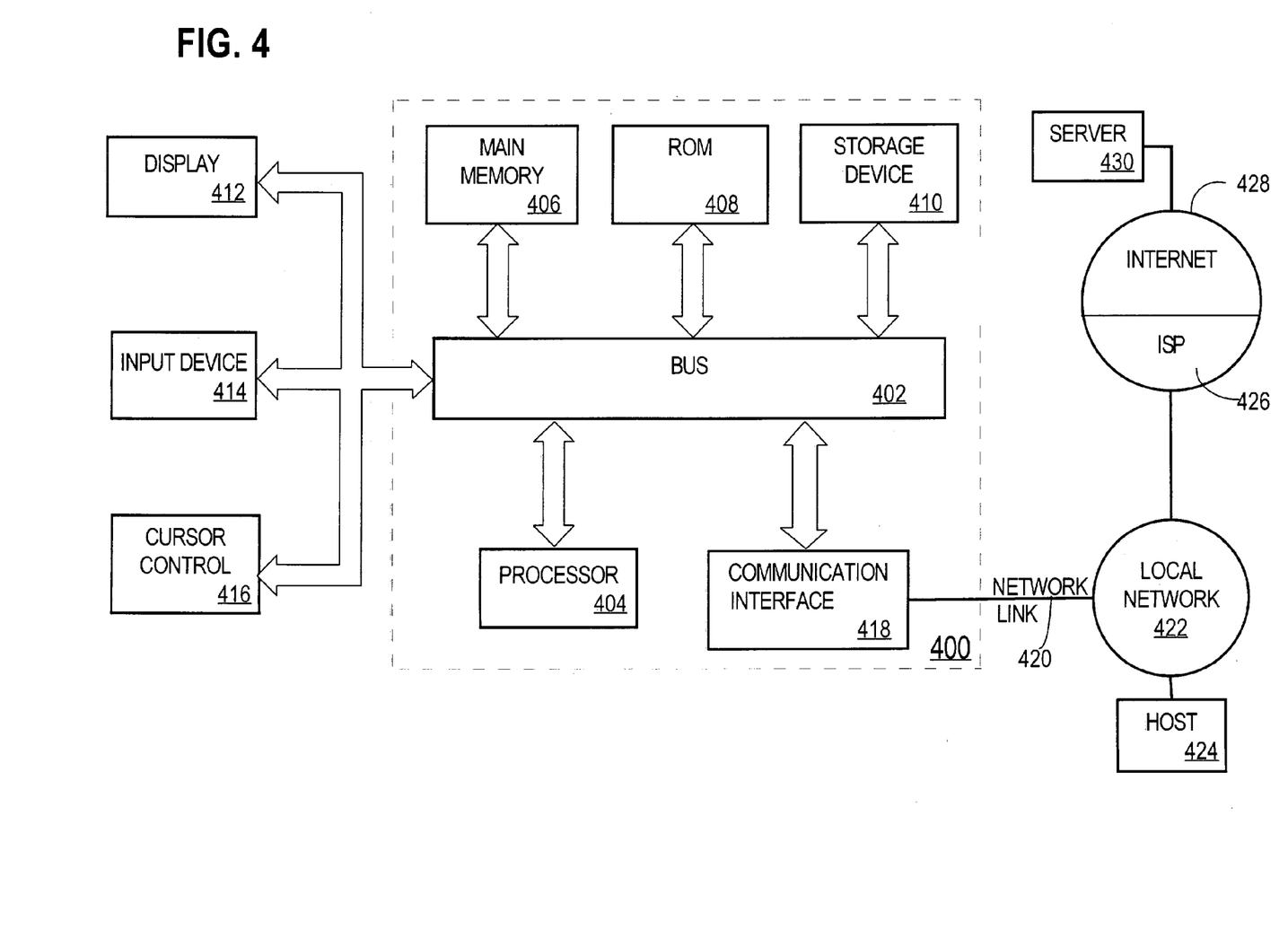
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, optical disk, or magneto-optical disk, is provided and coupled to bus 402 for storing information and instructions.

Computer system 400 may be coupled via bus 402 to a display 412, such as a cathode ray tube (CRT) or a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical, magnetic, or magneto-optical disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, rollup, grouping set and embedded total forms of solved cubes are described; however, configurations of pre-computed data other than those described may be implemented for use with the techniques described herein. For another example, the specific format of metadata used to define solved cubes may vary from implementation to implementation. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for performing an operation based on multidimensional data managed by a relational database management system, wherein the multidimensional data that is stored in the relational database includes a plurality of dimensions and at least one dimension of the plurality of dimensions includes a hierarchy having two or more levels of granularity, the method comprising the computer-implemented steps of:

registering, with said relational database management system, metadata that defines a cube, wherein said metadata includes
data that identifies that said cube is a solved cube; and
data that indicates how to handle requests that involve said solved cube, including data that identifies one or more machine-executable procedures which can be dynamically executed at runtime to compute resulting measure data for a particular scenario that the solved cube represents;
receiving, through an OLAP API, a request for an operation to be performed on multidimensional data associated with said solved cube; and
in response to said request, performing the steps of
determining, based at least in part on said metadata, that said solved cube can be used to fulfill said request,
determining, based on said metadata, one or more operations to perform to fulfill said request, and
generating results based on performing said one or more operations including executing at least one of said one or more machine-executable procedures.

2. The method of claim 1, wherein said metadata includes: data that identifies one or more mechanisms for obtaining all data associated with said solved cube.

3. A computer-readable storage medium carrying one or more sequences of instructions which, when executed by one or more processors, causes the one or more processors to perform the method recited in claim 1, wherein the computer-readable storage medium is one of volatile memory or non-volatile memory.

4. The method of claim 1,
wherein said database contains data that is pre-computed across at least two of said two or more levels of said at least one dimension; and
wherein said metadata identifies where, in said database, to locate particular data of said pre-computed data.

5. A computer-readable storage medium carrying one or more sequences of instructions which, when executed by one or more processors, causes the one or more processors to perform the method recited in claim 4, wherein the computer-readable storage medium is one of volatile memory or non-volatile memory.

6. The method of claim 1, wherein said metadata identifies columns maintained for each dimension of said plurality of dimensions.

7. A computer-readable storage medium carrying one or more sequences of instructions which, when executed by one or more processors, causes the one or more processors to perform the method recited in claim 6, wherein the computer-readable storage medium is one of volatile memory or non-volatile memory.

8. The method of claim 1, wherein said metadata describes a view.

9. The method of claim 5, wherein said view is defined in one or more SQL statements.

10. A computer-readable storage medium carrying one or more sequences of instructions which, when executed by one or more processors, causes the one or more processors to perform the method recited in claim 9, wherein the computer-readable storage medium is one of volatile memory or non-volatile memory.

11. The method of claim 8, wherein said view calls an executable procedure.

12. A computer-readable storage medium carrying one or more sequences of instructions which, when executed by one or more processors, causes the one or more processors to perform the method recited in claim 11, wherein the computer-readable storage medium is one of volatile memory or non-volatile memory.

13. The method of claim 8, wherein said view uses a table function.

14. A computer-readable storage medium carrying one or more sequences of instructions which, when executed by one or more processors, causes the one or more processors to perform the method recited in claim 13, wherein the computer-readable storage medium is one of volatile memory or non-volatile memory.

15. A computer-readable storage medium carrying one or more sequences of instructions which, when executed by one or more processors, causes the one or more processors to perform the method recited in claim 8, wherein the computer-readable storage medium is one of volatile memory or non-volatile memory.

16. The method of claim 1, wherein said metadata identifies a form associated with said solved cube.

17. The method of claim 16, wherein said solved cube references a column that is associated with a measure, for storing values of the measure that are grouped at levels of said plurality of dimensions.

18. A computer-readable storage medium carrying one or more sequences of instructions which, when executed by one or more processors, causes the one or more processors to perform the method recited in claim 17, wherein the computer-readable storage medium is one of volatile memory or non-volatile memory.

19. The method of claim 16,
wherein said form of said solved cube is a rollup form; and
wherein said solved cube references columns that are associated with each level of each dimension of said plurality of dimensions, for storing values that are associated with a respective level.

20. A computer-readable storage medium carrying one or more sequences of instructions which, when executed by one or more processors, causes the one or more processors to perform the method recited in claim 19, wherein the computer-readable storage medium is one of volatile memory or non-volatile memory.

21. The method of claim 16,
wherein said form of said solved cube is a rollup form;
wherein said solved cube references a table that includes columns that are associated with each level of each dimension of said plurality of dimensions for storing values that are associated with each level of each dimension, and columns for storing grouping identifiers that are associated with each dimension; and wherein said grouping identifiers identify a level of a dimension at which pre-computed data in said table is grouped.

22. A computer-readable storage medium carrying one or more sequences of instructions which, when executed by one or more processors, causes the one or more processors to perform the method recited in claim 21, wherein the computer-readable storage medium is one of volatile memory or non-volatile memory.

23. The method of claim 16,
wherein said form of said solved cube is a grouping set form;
wherein one or more levels of said plurality of dimensions are not specified as part of a grouping set associated with the solved cube; and
wherein said solved cube references columns that are associated with each level of each dimension of said plurality of dimensions, for storing values that are associated with a respective level.

24. The method of claim 23, wherein the particular value that is associated with columns that are associated with said one or more levels that are not specified as part of said grouping set is a null value.

25. A computer-readable storage medium carrying one or more sequences of instructions which, when executed by one or more processors, causes the one or more processors to perform the method recited in claim 24, wherein the computer-readable storage medium is one of volatile memory or non-volatile memory.

26. A computer-readable storage medium carrying one or more sequences of instructions which, when executed by one or more processors, causes the one or more processors to perform the method recited in claim 24, wherein the computer-readable storage medium is one of volatile memory or non-volatile memory.

27. The method of claim 16,
wherein said form of said solved cube is a grouping set form;
wherein one or more levels of said plurality of dimensions are not specified as part of a grouping set corresponding to said solved cube;
wherein said solved cube references a table that includes columns that are associated with each level of each dimension of said plurality of dimensions for storing values that are associated with each level of each dimension, and columns for storing grouping identifiers that are associated with each dimension; and
wherein said grouping identifiers identify a level of a dimension at which pre-computed data in said table is grouped.

28. A computer-readable storage medium carrying one or more sequences of instructions which, when executed by one or more processors, causes the one or more processors to perform the method recited in claim 27, wherein the computer-readable storage medium is one of volatile memory or non-volatile memory.

29. The method of claim 16,
wherein said form of said solved cube is an embedded total form; and
wherein said solved cube references columns that are associated with each dimension of said plurality of dimensions, for storing values that are associated with a respective level of a respective dimension.

30. A computer-readable storage medium carrying one or more sequences of instructions which, when executed by one or more processors, causes the one or more processors to perform the method recited in claim 29, wherein the computer-readable storage medium is one of volatile memory or non-volatile memory.

31. The method of claim 16,
wherein said form of said solved cube is an embedded total form;
wherein said solved cube references a table that includes columns that are associated with each dimension of said plurality of dimensions for storing values that are associated with a respective level of a respective dimension, and columns for storing grouping identifiers that are associated with each dimension; and
wherein said grouping identifiers identify a level of a dimension at which pre-computed data in said table is grouped.

32. A computer-readable storage medium carrying one or more sequences of instructions which, when executed by one or more processors, causes the one or more processors to perform the method recited in claim 31, wherein the computer-readable storage medium is one of volatile memory or non-volatile memory.

33. A computer-readable storage medium carrying one or more sequences of instructions which, when executed by one or more processors, causes the one or more processors to perform the method recited in claim 16, wherein the computer-readable storage medium is one of volatile memory or non-volatile memory.

34. A computer-readable storage medium carrying one or more sequences of instructions which, when executed by one or more processors, causes the one or more processors to perform the method recited in claim 1, wherein the computer-readable storage medium is one of volatile memory or non-volatile memory.

35. The method of claim 1, wherein said receiving a request includes receiving a query that identifies said solved cube.

36. A computer-readable storage medium carrying one or more sequences of instructions which, when executed by one or more processors, causes the one or more processors to perform the method recited in claim 35, wherein the computer-readable storage medium is one of volatile memory or non-volatile memory.

37. The method of claim 1, wherein said request is received through an OLAP API.

38. An apparatus for performing an operation based on multidimensional data managed by a relational database management system, wherein the multidimensional data that is stored in the relational database includes a plurality of dimensions and at least one dimension of the plurality of dimensions includes a hierarchy having two or more levels of granularity, the apparatus comprising:
one or more processors:
memory operatively coupled to the one or more processors:
means for registering, with said relational database management system, metadata that defines a cube, wherein said metadata includes
data that identifies that said cube is a solved cube; and
data that indicates how to handle requests that involve said solved cube, including data that identifies one or more machine-executable procedures which can be dynamically executed at runtime to compute resulting measure data for a particular scenario that the solved cube represents;
means for receiving, through an OLAP API, a request for an operation to be performed on multidimensional data associated with said solved cube;
means for determining, based at least in part on said metadata, that said solved cube can be used to fulfill said request,
means for determining, based on said metadata, one or more operations to perform to fulfill said request, and
means for generating results based on performing said one or more operations including executing at least one of said one or more machine-executable procedures.

39. The apparatus of claim 38, wherein the means for receiving includes means for receiving said request through an OLAP API.

* * * * *